(12) United States Patent
Lin et al.

(10) Patent No.: US 10,855,803 B2
(45) Date of Patent: Dec. 1, 2020

(54) PERFORMANCE EVALUATION IN A NETWORK COMMUNITY

(71) Applicant: Shanghai Bilibili Technology Co., Ltd., Shanghai (CN)

(72) Inventors: Xiaoshan Lin, Shanghai (CN); Fang Fang, Shanghai (CN)

(73) Assignee: Shanghai Bilibili Technology Co., Ltd., Shanghai (CN)

( * ) Notice: Subject to any disclaimer, the term of this patent is extended or adjusted under 35 U.S.C. 154(b) by 59 days.

(21) Appl. No.: 16/194,239

(22) Filed: Nov. 16, 2018

(65) Prior Publication Data

US 2019/0158623 A1    May 23, 2019

(30) Foreign Application Priority Data

Nov. 17, 2017 (CN) .......................... 2017 1 1146546

(51) Int. Cl.
*H04L 29/08* (2006.01)
*G06Q 50/00* (2012.01)

(52) U.S. Cl.
CPC .......... *H04L 67/306* (2013.01); *G06Q 50/01* (2013.01); *H04L 67/22* (2013.01)

(58) Field of Classification Search
CPC ......... G06Q 50/01; H04L 51/32; H04L 63/08; G06F 16/9535; G06F 3/0482; G06F 3/04817; G06F 16/2255; G06F 16/2379; G06F 16/27; G06F 16/335; G06F 16/9536; H04N 21/4312; H04N 21/4532; H04N 21/4667; H04N 21/4722; H04N 21/47815; H04N 21/4788; H04N 21/812; H04W 4/029
See application file for complete search history.

(56) References Cited

U.S. PATENT DOCUMENTS

| 9,547,637 | B2* | 1/2017 | Jaffe ....................... G06Q 10/10 |
| 10,269,323 | B2* | 4/2019 | Trachtenberg ........ G06F 3/1446 |
| 10,540,404 | B1* | 1/2020 | Dang ..................... G06F 16/285 |
| 2009/0119258 | A1* | 5/2009 | Petty ...................... G06Q 30/02 |

(Continued)

FOREIGN PATENT DOCUMENTS

| CN | 102012926 A | 4/2011 |
| CN | 105005874 A | 10/2015 |

(Continued)

*Primary Examiner* — Ninos Donabed
(74) *Attorney, Agent, or Firm* — BakerHostetler (57) ABSTRACT

Techniques for evaluating performance of reviewing events in a network community are described herein. The disclosed techniques include authorizing a first user account to review the events in the network community for a first valid period; monitoring information associated with the first user account reviewing the events in the network community; generating data indicative of review behaviors associated with the first user account during at least a part of the first valid period based at least in part on the information and predetermined parameters of evaluating performance; determining values of a plurality of evaluation coefficients based on the generated data and predetermined rules; and determining a performance evaluation result for the first user account based on the generated data and the values of the plurality of evaluation coefficients.

18 Claims, 6 Drawing Sheets

(56) References Cited

U.S. PATENT DOCUMENTS

| | | | |
|---|---|---|---|
| 2009/0311658 A1* | 12/2009 | Polivka | G09B 5/00 434/350 |
| 2010/0058431 A1 | 3/2010 | McCorkendale et al. | |
| 2012/0054592 A1* | 3/2012 | Jaffe | G06F 19/328 715/224 |
| 2013/0055074 A1* | 2/2013 | Trese | G06F 40/166 715/255 |
| 2014/0059416 A1* | 2/2014 | Jaffe | G06F 19/328 715/224 |
| 2014/0281559 A1* | 9/2014 | Trachtenberg | H04N 21/2347 713/178 |
| 2014/0340330 A1* | 11/2014 | Trachtenberg | H04N 5/64 345/173 |
| 2015/0070340 A1* | 3/2015 | Trachtenberg | H04N 21/4122 345/211 |
| 2015/0248649 A1* | 9/2015 | Avats | G06Q 50/01 705/321 |
| 2015/0310195 A1* | 10/2015 | Bailor | G06F 21/316 726/6 |
| 2015/0363736 A1* | 12/2015 | Flannery | G06Q 10/06398 705/7.42 |
| 2016/0114820 A1* | 4/2016 | Palmer | B61L 27/0077 246/107 |
| 2017/0083502 A1* | 3/2017 | Jaffe | G06F 19/328 |
| 2017/0277873 A1* | 9/2017 | Bailor | G06F 21/45 |
| 2017/0308944 A1* | 10/2017 | Gilb | G06Q 30/0619 |
| 2017/0374311 A1* | 12/2017 | Trachtenberg | H04N 5/64 |
| 2018/0351991 A1* | 12/2018 | Jones | H04L 63/107 |

FOREIGN PATENT DOCUMENTS

| | | |
|---|---|---|
| CN | 106372848 A | 2/2017 |
| CN | 106470109 A | 3/2017 |
| CN | 106530169 A | 3/2017 |
| CN | 106780193 A | 5/2017 |

\* cited by examiner

Fig. 9

PERFORMANCE EVALUATION IN A NETWORK COMMUNITY

BACKGROUND

Users may attempt to access conventional social media on their devices to communicate about interesting content. Using conventional social media may be cumbersome as users may have to switch back and forth between different applications to access the content of interest and social media related to the content. As communication devices, such as mobile phones, become more sophisticated, people continue to discover new ways to communicate.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION OF ILLUSTRATIVE EMBODIMENTS

Figure 1:
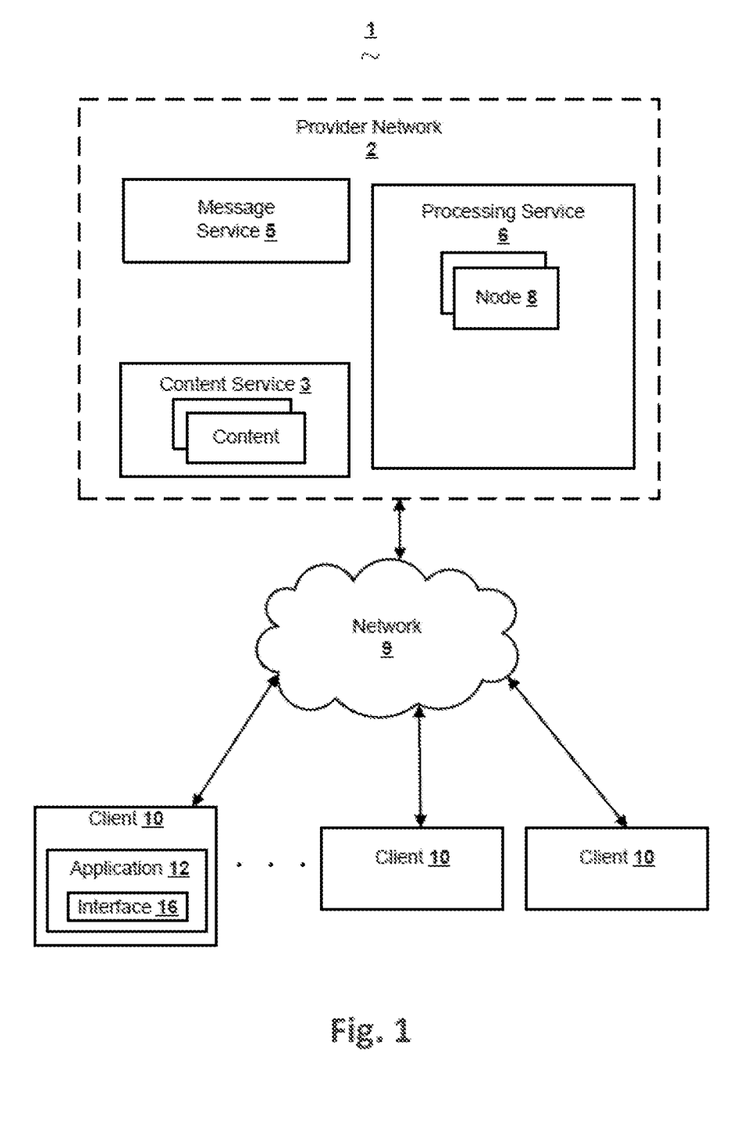
FIG. 1 is a schematic diagram illustrating an example system that may be used in accordance with the present disclosure.

FIG. 1 is a schematic diagram showing an example system 1 that may be used in accordance with the present disclosure. The system 1 may comprise a provider network 2 and a plurality of client devices 10. The provider network 2 and the plurality of client devices 10 may communicate with each other via one or more networks 9.

In some embodiments, the content service 3 may be implemented as part of the provider network 2. In other embodiments, the content service 3 may be managed by a separate service provider than a service provider of the provider network 2. It should also be understood that the provider network 2 may provide additional content services separate from the content service 5.

The content service 3 may comprise a content streaming service, such as an Internet protocol video streaming service. The content streaming service may be configured to distribute content via a variety of transmission techniques. The content service 3 may be configured to provide the content, such as video, audio, textual data, a combination thereof, and/or the like. The content may comprise content streams (e.g., video stream, audio stream, information stream), content files (e.g., video file, audio file, text file), and/or other data. The content may comprise gaming content. For example, the content service 5 may comprise a collaborative gaming platform, a video sharing service, a video hosting platform, a content distribution platform, and/or the like.

The provider network 2 may implement a commentary service configured to allow users to comment and/or share comments associated with content. The comments may be displayed with the content on the same screen. For example, the comments may be displayed in an overlay above the content. The comments may be encoded into a format of the content. For example, the comments may be encoded as video content as the original content. The comments may be animated when displayed. For example, the comments may be shown scrolling (e.g., from right to left, left to right, top to bottom, bottom to top) across the content, which may be referred to as "bullet screen."

The provider network 2 may be located at a data center, such as a single premises, or be distributed throughout different geographic locations (e.g., at several premises). The provider network 2 may provide the services via the one or more networks 9. The networks 9 comprise a variety of network devices, such as routers, switches, multiplexers, hubs, modems, bridges, repeaters, firewalls, proxy devices, and/or the like. The networks 9 may comprise physical links, such as coaxial cable links, twisted pair cable links, fiber optic links, a combination thereof, and/or the like. The networks 9 may comprise wireless links, such as cellular links, satellite links, Wi-Fi links and/or the like.

The provider network 2 may comprise a message service 5. The message service 5 may be configured to receive a plurality of messages. The plurality of messages may comprise a plurality of comments associated with content and information related to the plurality of comments. The plurality of messages may be associated with a particular content item, content session, and/or the like.

The message service 5 may be configured to manage messages for various content items. Users may browse content and access different content items to view comments for particular content, such as comments posted by other users for that particular content. Comments from users associated with a particular content item may be output to other users watching the particular content item. For example, all users accessing a content item (e.g., video clip) may view comments associated with the content item. Comments that are input may be output in real-time or near-real-time.

The message service 5 may be configured to process the plurality of messages. The message service 5 may implement a queue or otherwise prioritize processing of the plurality messages based on information, e.g., time stamps, incremented identifier, associated with corresponding comments. The message service 5 may be configured to process the plurality of messages using load balancing. For example, the message service 5 may be configured to use one or more of the plurality of processing nodes to process the messages, prioritize the messages, load balance the messages, and/or the like. The message service 5 may store, at least temporarily, the plurality of messages. The message service 5 may store the messages in a datastore, such as a database.

The message service 5 may be configured to process a message by performing a grouping process. The grouping process may comprise grouping messages based on a characteristic. If two messages have the same characteristic or are within a threshold range of a characteristic, then the messages may be grouped. Messages associated with a particular content item (e.g., stream, file, show, movie, song, game session) may be associated with the same group. For example, a message may comprise or be associated with a content identifier. The content identifier may uniquely identify the content item. The message service 5 may associate a message with a group associated with the content item if the content identifier is found in the message or otherwise associated with the message (e.g., sent separately).

The message service 5 may perform natural language processing, topic recognition, pattern recognition, artificial intelligence, and/or the like to automatically determine characteristics of the messages and/or group the messages. As an example, frequently occurring phrases or patterns may be identified as topics. As another example, a database of topics associated with content may be maintained. The topics may include genres (e.g., action, drama, comedy), personalities (e.g., actors, actresses, directors), languages, and/or the like. Messages may be grouped based on characteristics of the client device and/or users sending the messages. Demographics, interests, history, and/or like may be stored for a plurality of users to determine potential groupings of messages.

The message service 5 may be configured to process messages by determining contexts for outputting (e.g., displaying, presenting) comments comprised in the messages. The context may comprise a context for outputting a comment based on the grouping. The context may comprise a time context associated with a time to output the comment.

A message may indicate a time when a comment was input by a user. The time may comprise a time internal to the content item or other similar information, such as fragment identifiers. For example, the time may indicate a portion of the content item (e.g., one or more content fragments) that was viewed by a user when the user input a comment. The time may indicate when a user started inputting the comment, a duration of inputting, a time when the input was submitted, and/or the like.

The message service 5 may determine to output a comment during or close to the portion of content item being commented. In an example, if multiple messages are received for a portion of time (e.g., a scene), then a time offset may be added to some of the messages to prevent all of corresponding comments from being output at the same time.

The context may further comprise a graphical context associated with a form of the comment. The graphical context may comprise a size, a color, a font, and/or the like. The context may comprise a moving context in which the comment moves when output. The moving context may comprise an animation. For example, the moving context may comprise a direction of movement (e.g., left to right, right to left, up to down, down to up, diagonally). The moving context may comprise any type of animation, such as a spinning motion, a waving motion, a zig-zag, a circular motion, increasing in size, decreasing in size, and/or the like.

The context may be determined based on a preference associated with a message. For example, a user may specify a preference for how a corresponding comment is to be output. The user may specify the context for a particular comment. The context may be determined based on a characteristic of a particular content item. For example, the graphical context may be determined based on the background color of the content item during a particular segment. The graphical context may contrast with the background color of the content item.

The message service 5 may be further configured to process a message by generating output data. The output data may comprise instructions for implementing outputting a comment based on corresponding context. The output data may comprise application data for instructing an application to overlay the comment based on the context. The output data may comprise instructions for generating (e.g., encoding) content corresponding to a comment.

The output data may be used to generate (e.g., encode) output commentary content, such as an output content stream. The output commentary content may be combined (e.g., multiplexed) with original content item such as the content provided by the content service 3. The resulting combination may comprise content in a single package (e.g., container, transport container, transport stream). The package may comprise the original content item along with the output commentary content (e.g., displayed on top of the original content item).

The message service 5 may be further configured to process messages by performing a screening process. The screening process may comprise rejecting or flagging messages that match screening criteria. The screening criteria may specify terms and/or phrases, such as profanity, hate speech, indecent language, and/or the like. The screening criteria may specify characters, such as symbols, fonts, and/or the like. The screening criteria may specify languages, computer readable code patterns, and/or the like.

The provider network 2 may further comprise a processing service 6. The processing service 6 may be configured to provide processing for a variety of services, such as the services of the provider network 2. The processing service 6 may comprise a plurality of processing nodes 8 (e.g., as a service). The plurality of processing nodes 8 may process tasks associated with a message service 5. The plurality of processing nodes 8 may be implemented as one or more computing devices, one or more processors, one or more virtual computing instances, a combination thereof, and/or the like.

The plurality of processing nodes 8 may be implemented by one or more computing devices. The one or more computing devices may comprise virtualized computing instances. The virtualized computing instances may comprise a virtual machine, such as an emulation of a computer system, operating system, server, and/or the like. A virtual machine may be loaded by a computing device based on a virtual image and/or other data defining specific software (e.g., operating systems, specialized applications, servers) for emulation. Different virtual machines may be loaded and/or terminated on the one or more computing devices as the demand for different types of processing services changes. A hypervisor may be implemented to manage the use of different virtual machines on the same computing device.

The plurality of processing nodes 8 may comprise nodes associated with providing specific services (e.g., processing tasks). The nodes may be dedicated to providing these specific services. For example, the plurality of processing nodes 8 may implement a receiver, a content generator, a combiner, a transcoder, a combination thereof.

In some embodiments, the plurality of processing nodes 8 may process events submitted by the plurality of client computing devices. The events may be associated with discussing real-time news, videos, social hot topics, reports against certain user accounts, and/or the like. In other embodiments, the plurality of processing nodes 8 may process performance evaluation for a plurality of user account who review events in the network community. In some implementations, these services may be implemented as dedicated computing devices, dedicated processors, dedicated virtual machine instances, and/or the like. In other implementations, a variety of different nodes may implement any of the functions associated with these services.

The plurality of client devices 10 may be configured to access the content and the services of the provider network 2. The plurality of client devices 10 may comprise any type of computing device, such as a mobile device, a tablet device, laptop, a computing station, a smart device (e.g., smart apparel, smart watch, smart speaker, smart glasses), a virtual reality headset, a gaming device, a set top box, digital streaming device, robot, a vehicle terminal, a smart TV, a TV box, an e-book reader, MP3 (Moving Picture Experts Group Audio Layer III) players, MP4 (Moving Picture Experts Group Audio Layer IV) players, and so on.

The plurality of client devices 10 may be associated with one or more users. A single user may use one or more of the plurality of client devices 10 to access the provider network 2. The plurality of client devices 10 may travel to a variety of locations and use different networks to access the provider network 2.

An example client device 10 may comprise an application 12. The application 12 outputs (e.g., display, render, present) content to a user. The content may comprise videos, audio, comments, textual data and/or the like. The application 12 may also provide a menu for navigating a variety of content.

The client device 10 may access an interface 16 that allows users to provide comments associated with corresponding content and submit events to a processing service. The interface 16 may comprise an input element. For example, the input element may be configured to receive input from a user, such as comments associated with a particular content, events, user accounts, and/or the like. In some embodiments, the interface 16 may be implemented as part of the application 12.

The application 12 may allow a user to set a context (e.g., color, font size, animation, emoji, scrolling direction) associated with his or her input. The application 132 may determine (e.g., automatically) other context information, such as timing information (e.g., start time, duration, end time for the input). The application 12 may send the input, the context, the context information, and/or other information to the message service 5 of the provider network 2.

The application 12 may also send events to a processing service. As an example, the application 12 may send reports against certain users to a processing service, and the application 12 may also send reviews about the reports to the processing service. The events or reviews sent from the plurality of client computing devices comprise reasons of submitting the events, content attributes associated with the events, user account information, and/or the like. The techniques for processing events and evaluating performance of a plurality of user accounts in accordance with the present disclosure can be implemented by the example system as shown in FIG. 1.

Figure 2:
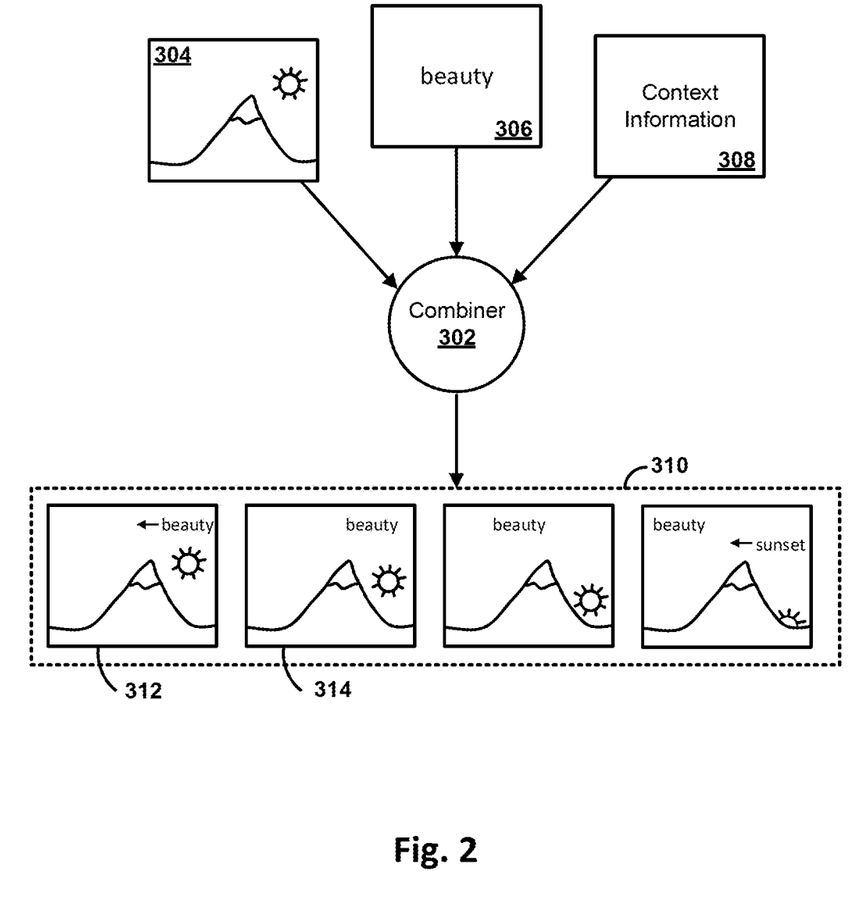
FIG. 2 is a schematic diagram illustrating an example process for combining content that may be used in accordance with the present disclosure.

FIG. 2 is a schematic diagram showing an example process for combining content. A combiner 7 may be configured to receive content 11. As illustrated in this example, the content 11 may comprise a video. It should be understood that other content may be used. The content 11 may comprise a plurality of frames, such as a series of images. The plurality of frames may be time ordered. For example, a first frame may be ordered before a second frame.

The combiner 7 may be implemented by any of the services and/or devices described herein. For example, the combiner 7 may be implemented by the processing service 6 or the message service 5 of the provider network 2. In other examples, the combiner 7 may be implemented by the application 12 of the client devices 10.

The combiner 7 may be configured to receive message data 13 associated with the content 11. The message data 13 may comprise one or more characters. As illustrated in this example, shown in FIG. 2, a Chinese character 美 is shown. It should be understood, that the message data 13 may comprise multiple characters, symbols, and/or like in one or more languages. For example, the message data 13 may comprise comments from users associated with the content 11.

The combiner 7 may be further configured to receive context information 15. The context information 15 may indicate a context for rendering the message data 13 associated with the content 11. The context information 15 may comprise timing information indicating a time to render the message data 13 with the content 11. The context information 15 may comprise a start time associated with the message data, a scrolling speed, a font size, a font color, an end time associated with the message data, and/or other relevant information.

The combiner 7 may be configured to combine the content 11 and the message data 13 to generate combined content 17 based on the context information 15. The combiner 7 may combine the content 11 and the message data 13 by generating a content package. The content package may comprise a container, such as a transport container (e.g., MPEG transport or other transport container), a formatted container (e.g., as specified for an encoding format). The content package may comprise instructions for a rendering engine to render the content 11 and the message data 13 at least partially together.

As shown in FIG. 2, the combiner 7 may combine the content 11 and the message data 13 by generating a modified video. For example, at least a portion of the message data may be added to the plurality of frames. The message data may be animated separately from the video and/or may be combined with (e.g., overlain, inserted into, added to, associated with, encoded into) frames of the video.

Using the content information, positions (e.g., relative to the plurality of frames) for the message data (e.g., characters) may be determined for one or more (or each) of the plurality of frames. A first position may be determined for a first frame 18. A second position may be determined for the second frame 19. The second position may be different than the first position. The second position may be determined based on the first position.

For example, a path for rendering characters of the message data may be determined. The path may specify a direction for animating and/or scrolling text above the content 11. The direction may vary. For example, the path may be curvilinear. The second position may be further along the path than the first position (e.g., if the second frame is after the first frame in the time ordering). If the path is from right to left, as shown in FIG. 2, then the second position may be further left than the first position. The combiner 7 may combine the content 11 and the message data 13 in a manner that the message data 13 is successively rendered along the path as the plurality of frames of the content progress.

Though only one character is shown, the combiner 7 may be configured to receive message data from a variety of sources at any time and combine the message data 13 with the content 11. For example, message data 13 from a plurality of users may be received and combined with the content 11. Different message data 13 may be combined in a manner that the message data 13 is rendered at least partially simultaneously.

For example, several messages from different users (e.g., another user may comment "H" or sunset) may be rendered at least partially at the same time with the content 11. The message data may be combined in a manner that allows for the content 11 to remain viewable during rendering of the message data. For example, the message data may be combined with the content 11 using constraints that limit the number of messages shown simultaneously, limit the location of message data (e.g., shown in areas where pixels have less change, shown in background areas of the content), and/or the like as described further herein. As an example, the message data may be shown in a background, such as the sky behind a mountain in the example of FIG. 2. In other embodiments, the message data are not received as a series of messages, but rather the messages are combined and rendered by a separate service. In such an embodiment, the messages are not separately identifiable by the combiner 7 but rather are received as, e.g., a video overlay.

Figure 3:
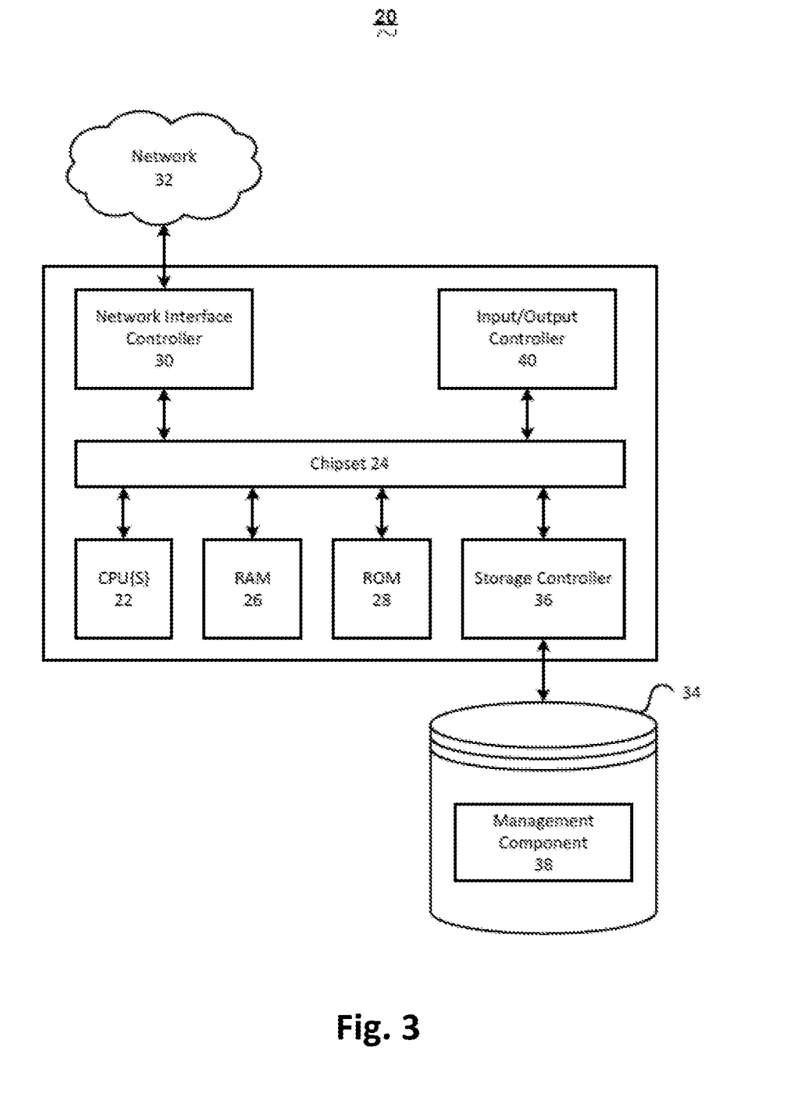
FIG. 3 is a schematic diagram illustrating an example computing device that may be used in accordance with the present disclosure.

FIG. 3 depicts a computing device that may be used in various aspects, such as the services, networks, and/or clients depicted in FIG. 1. With regard to the example architecture of FIG. 1, the message service, content service, processing service, provider network, and client may each be implemented by one or more an instances of a computing device 20 of FIG. 3. The computer architecture shown in FIG. 3 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 20 may include a baseboard, or "motherboard," which is a printed circuit board to which a multitude of components or devices may be connected by way of a system bus or other electrical communication paths. One or more central processing units (CPUs) 22 may operate in conjunction with a chipset 24. The CPU(s) 22 may be standard programmable processors that perform arithmetic and logical operations necessary for the operation of the computing device 20.

The CPU(s) 22 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 22 may be augmented with or replaced by other processing units, such as GPU(s). The GPU(s) may comprise processing units specialized for but not necessarily limited to highly parallel computations, such as graphics and other visualization-related processing.

A chipset 24 may provide an interface between the CPU(s) 22 and the remainder of the components and devices on the baseboard. The chipset 24 may provide an interface to a random access memory (RAM) 26 used as the main memory in the computing device 20. The chipset 24 may further provide an interface to a computer-readable storage medium, such as a read-only memory (ROM) 28 or non-volatile RAM (NVRAM) (not shown), for storing basic routines that may help to start up the computing device 20 and to transfer information between the various components and devices. ROM 28 or NVRAM may also store other software components necessary for the operation of the computing device 20 in accordance with the aspects described herein.

The computing device 20 may operate in a networked environment using logical connections to remote computing nodes and computer systems through local area network (LAN). The chipset 24 may include functionality for providing network connectivity through a network interface controller (NIC) 30, such as a gigabit Ethernet adapter. A NIC 30 may be capable of connecting the computing device 20 to other computing nodes over a network 32. It should be appreciated that multiple NICs 30 may be present in the computing device 20, connecting the computing device to other types of networks and remote computer systems.

The computing device 20 may be connected to a mass storage device 34 that provides non-volatile storage for the computer. The mass storage device 34 may store system programs, application programs, other program modules, and data, which have been described in greater detail herein. The mass storage device 34 may be connected to the computing device 20 through a storage controller 36 connected to the chipset 24. The mass storage device 34 may consist of one or more physical storage units. The mass storage device 34 may comprise a management component 38. A storage controller 36 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 20 may store data on the mass storage device 34 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 34 is characterized as primary or secondary storage and the like.

For example, the computing device 20 may store information to the mass storage device 34 by issuing instructions through a storage controller 36 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 20 may further read information from the mass storage device 34 by detecting the physical states or characteristics of one or more particular locations within the physical storage units.

In addition to the mass storage device 34 described above, the computing device 20 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 20.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 34 depicted in FIG. 2, may store an operating system utilized to control the operation of the computing device 20. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 34 may store other system or application programs and data utilized by the computing device 20.

The mass storage device 34 or other computer-readable storage media may also be encoded with computer-executable instructions, which, when loaded into the computing device 20, transforms the computing device from a general-purpose computing system into a special-purpose computer capable of implementing the aspects described herein. These computer-executable instructions transform the computing device 20 by specifying how the CPU(s) 22 transition between states, as described above. The computing device 20 may have access to computer-readable storage media storing computer-executable instructions, which, when executed by the computing device 20, may perform the methods described herein.

A computing device, such as the computing device 20 depicted in FIG. 2, may also include an input/output controller 432 for receiving and processing input from a number of input devices, such as a keyboard, a mouse, a touchpad, a touch screen, an electronic stylus, or other type of input device. Similarly, an input/output controller 40 may provide output to a display, such as a computer monitor, a flat-panel display, a digital projector, a printer, a plotter, or other type of output device. It will be appreciated that the computing device 20 may not include all of the components shown in FIG. 2, may include other components that are not explicitly shown in FIG. 2, or may utilize an architecture completely different than that shown in FIG. 2.

As described herein, a computing device may be a physical computing device, such as the computing device 20 of FIG. 2. A computing node may also include a virtual machine host process and one or more virtual machine instances. Computer-executable instructions may be executed by the physical hardware of a computing device indirectly through interpretation and/or execution of instructions stored and executed in the context of a virtual machine.

Embodiment 1

Figure 4:
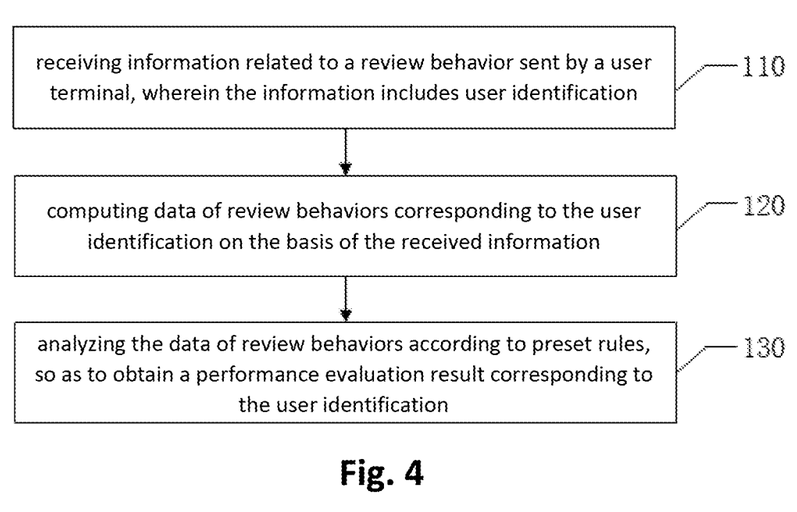
FIG. 4 is a flowchart illustrating an example process of the first embodiment of the present disclosure.

FIG. 4 is a flowchart of the first embodiment of the performance evaluating method of the present invention. As shown in FIG. 4, the performance evaluating method of the present embodiment is implemented by a server, may comprises following steps:

Step 110, receiving information related to a review behavior sent by a user terminal, wherein the information includes user identification.

Wherein, the review behavior refers to the user's voting and comments on the reported content and other related behaviors based on voting and comments; the information related to a review behavior refers to the information collected can reflect the review behavior of the user during the valid period of the review qualification corresponding to the user identification, such as voting information, viewpoint information, viewpoint being licked and disliked information, validation question answer information, anti-cheating warning information, illegal information, being reported information, etc. When the user doing operation related to review behavior on the user terminal, the user terminal obtains the corresponding information and sends it to the server, in order to correlate the information sent by the user terminal with the user identification, the information sent by the user terminal related to the review behavior includes the user identification, which can be, but is not limited to, the user account.

Step 120, computing data of review behaviors corresponding to the user identification on the basis of the received information.

After receiving the information related to the review behavior, through statistical analysis of the information, the server can obtain the data of review behavior corresponding to the user identification. Since the data of review behavior is obtained from the original data analysis with the information related to the review behavior, it can objectively reflect the review behavior process of a user in a certain period.

In one embodiment, the step 120 may include: filtering out target information from the received information; obtaining the data of review behaviors corresponding to the user identification by computing the target information at preset intervals during a valid period of review qualification corresponding to the user identification. Wherein, the valid period of review qualification could be, but is not limited to, 30 days, during the valid period of review qualification, the information related to the review behavior can reflect the review behavior corresponding to the user identification, but not all the information related to the review behavior is the information related to the performance evaluation, therefore, after receiving the information related to the review behavior, the received information can be filtered according to the data required for performance evaluation so as to obtain the target information, at an interval during the valid period of review qualification corresponding to the user identification, such as 0 o'clock of everyday, computing the filtered target information to obtain the data of review behavior corresponding to the user identification. It should be understood that, at the time of computing the target information, if the valid period of review qualification corresponding to user id identification A has lasted for N days, and the valid period of review qualification corresponding to user identification B has lasted for M days, the computing process is a process of analyzing the target information of N days of user identification A and the target information of M days of user identification B.

In one embodiment, the data of review behavior include number of voting cases, voting accurate number, voting accurate rate, number of viewpoints, number of viewpoints liked and disliked, active days, illegal times, number of incorrect validation questions, level of anti-cheating alarm as well as their combinations. In other words, the data of review behavior can include one or more of the number of voting cases, voting accurate number, voting accurate rate, number of viewpoints, number of viewpoints liked and disliked, active days, illegal times, number of incorrect validation questions and level of anti-cheating alarm.

The voting cases refer to the cases generated by the case system according to the contents which be reported in the community. When a user identification has the corresponding review qualification, it can decide whether its content is illegal or not by voting on the case. After voting on the case, a judgment result of the case will be generated. If the voting information corresponding to the case of the user identification is as same as the judgment result of the case, the user identification is considered to be accurate in voting the case. Therefore, the number of voting cases can be accumulated according to the number of votes corresponding to the user identification every day. The voting accurate number can be accumulated according to the accurate number of votes corresponding to the user identification every day. The voting accurate rate is the proportion of the voting accurate number in the number of voting cases.

The active days refer to the days when the user identification has voting information, that is, when the voting information of the user identification is collected, the day is marked as active.

When users vote on voting cases during the valid period of review qualification, they can release corresponding views optionally, the views will be displayed randomly on the case voting page. After the user released the views, other users within the valid period of the review qualification can like/dislike the views. The data of like/dislike is generated after the corresponding user completes the vote, and the data will be sent to the server for accumulation. So that, the number of views can be accumulated according to the number of views released each day corresponding to the user identification, and the number of viewpoints liked and disliked can be accumulated according to the number of views liked and disliked each day corresponding to the user identification.

When the user is prohibited or punished during the valid period of review qualification, the cumulative number of times of the user is prohibited and punished is the illegal times.

When the case system sends the case to the corresponding user for voting, the validation questions with correct answers can be randomly sent to prevent invalid voting behaviors such as malicious voting and random voting. The validation questions are added by the administrator through the administrative background, including the content of the questions, accurate options and explanation. The validation question follows the principle of "no dispute, complicated question, legal basis". When the user's voting result does not conform to the accurate options of validation questions, an alarm box will pop up to prompt the user the failure and display the explanation of the accurate options. By accumulating the number of accurate or wrong votes of the validation questions, the number of incorrect validation questions corresponding to the user identification can be obtained as the reference data for performance evaluating and qualification assessment.

In online communities, it is common to cheat by brushing fans, clicking and reading.

The level of anti-cheating alarm refers to the warning level given by the anti-cheating system to corresponding users based on the results of detection of these cheating behaviors.

In one embodiment, after the step of computing data of review behaviors corresponding to the user identification on the basis of the received information, the method further comprises: judging whether the user identification is meet the condition of automatic repealing the review qualification, the condition includes illegal behaviors and number of incorrect validation questions; if the condition is met, automatic repealing the review qualification corresponding to the user identification to stop the performance evaluating corresponding to the user identification; if the condition is not met, entering the step of analyzing the data of review behaviors according to preset rules, so as to obtain a performance evaluating result corresponding to the user identification. In another words, when computing the data of review behavior corresponding to the user identification, if the illegal information corresponding to the user identification is found in the data of review behavior or the number of incorrect validation questions is over a setting number, the review qualification shall be revoked directly and the performance evaluating shall not be conducted. In addition, for the user identification with serious illegal information, the user identification on the blacklist will not be able to apply for the review qualification again while its review qualification is revoked.

Step 130, analyzing the data of review behaviors according to preset rules, so as to obtain a performance evaluating result corresponding to the user identification.

After obtain the data of review behavior by computing, analyzing the data according to preset rules, such as according to weight information, analysis model and so on, to obtain a performance evaluating result corresponding to the user identification finally.

In one embodiment, the step 130 may include: obtaining the data of review behaviors corresponding to each evaluation coefficient; determining the value of each evaluation coefficient according to the preset rules and the corresponding data of review behaviors, wherein, said preset rules include the corresponding relationship between the ranges of the values of the data of review behaviors and the values of evaluation coefficients; calculating a performance evaluating score corresponding to the user identification according to each evaluation coefficient and certain data of review behaviors.

In one embodiment, the evaluation coefficients include voting accurate coefficient, active coefficient, illegal coefficient, viewpoint coefficient, incorrect validation coefficient, anti-cheating coefficient as well as their combinations, the certain data of review behaviors include number of voting cases, voting accurate rate, number of viewpoints, number of viewpoints liked and disliked as well as their combinations.

Wherein, the value of the voting accurate coefficient is decided by the range of the voting accurate rate; the value of the active coefficient is decided by the range of the active days; the value of the illegal coefficient is decided by the illegal times. When illegal times is greater than 0, the value of the illegal coefficient is 0; otherwise, it is 1. The value of the viewpoint coefficient is decided by the range of the number of viewpoints and the number of viewpoints liked and disliked; the value of the incorrect validation coefficient is decided by the range of the number of incorrect validation questions; the value of the anti-cheating coefficient is decided by the range of the level of anti-cheating alarm. The certain data of review behaviors refers to those data of review behaviors which used to calculate a performance evaluating score with the evaluation coefficients in all data of review behaviors.

In one embodiment, the step of determining the value of each evaluation coefficients according to the preset rules and the correspondingly data of review behaviors includes: obtaining preset rules which include the corresponding relationship between the ranges of the values of the data of review behaviors and the values of evaluation coefficients; calculating a rule adjusting coefficient, the rule adjusting coefficient is a ratio of the lasting time of the review qualification corresponding to the user identification in the present moment to the valid period of the review qualification; adjusting the corresponding relationship between the ranges of the values of the data of review behaviors and the values of evaluation coefficients in the preset rules according to the rule adjusting coefficient; determining the value of each evaluation coefficient according to the value of the data of review behaviors corresponding to each evaluation coefficient.

During the process of the step 130, at the current time, the duration of the review qualification of different user identifications may not same, but the preset rules are same to the user identifications with review qualification. Therefore, in the unified calculation of the performance evaluating score, the preset rule shall be adjusted according to the duration of review qualification corresponding to the current time of different user identifications, so that the corresponding relationship between the value range of the data of review behaviors and the value of evaluation coefficient conform to the actual situation of each user identification. For example, if the duration of review qualification corresponding to the current time of user identification A is 10 days, and the valid period of the review qualification is 30 days, the rule adjusting coefficient is 10/30=⅓. The corresponding relation between the range of active days and the value of active coefficients is adjusted according to the rule adjusting coefficient. If the preset rule is that the coefficient value is 'a' for 20-30 active days, the adjusted rule is the coefficient value is 'a' for 20/3-30/3 active days.

In one embodiment, after the step of calculating a performance evaluating score corresponding to the user identification according to each evaluation coefficient and a certain data of review behaviors, further comprises: judging whether the valid period of the review qualification corresponding to the user identification is over; if yes, determining a rank corresponding to the user identification according to the performance evaluating score; determining a performance level and a bonus corresponding to the user identification according to the rank.

After calculating a performance evaluating score, if the valid period of the review qualification corresponding to the user identification is not over, only recording the performance evaluating score calculated. if the valid period of the review qualification corresponding to the user identification is over, determining a rank in all user identifications with review qualification corresponding to the user identification according to the performance evaluating score; and then determining a performance level and a bonus corresponding to the user identification according to the rank, the bonus determined by the performance level. According to the rank, different bonus will be given include a review qualification with a preset duration. If the performance level is lower than the set level, the review qualification will be revoked directly.

In one embodiment, after the step 130, further comprises: monitoring review interface access information sent by the user terminal, the review interface access information includes the user identification; if the present received review interface access information is the first received review interface access information after the valid period of the review qualification corresponding to the user identification, sending the performance evaluating result to the user terminal corresponding to the user identification to display. When sending the performance evaluating result to the user terminal corresponding to the user identification to display, other related information may be displayed at same time, such as user profile picture, nickname, number, starting and ending time of the valid period of review qualification, number of votes within the valid period of review qualification, active days, rank of performance evaluating score, performance level, bonus detail, etc. After closing the above display, users can also review it through the entrance on the home page of the review interface.

Embodiment 2

Figure 5:
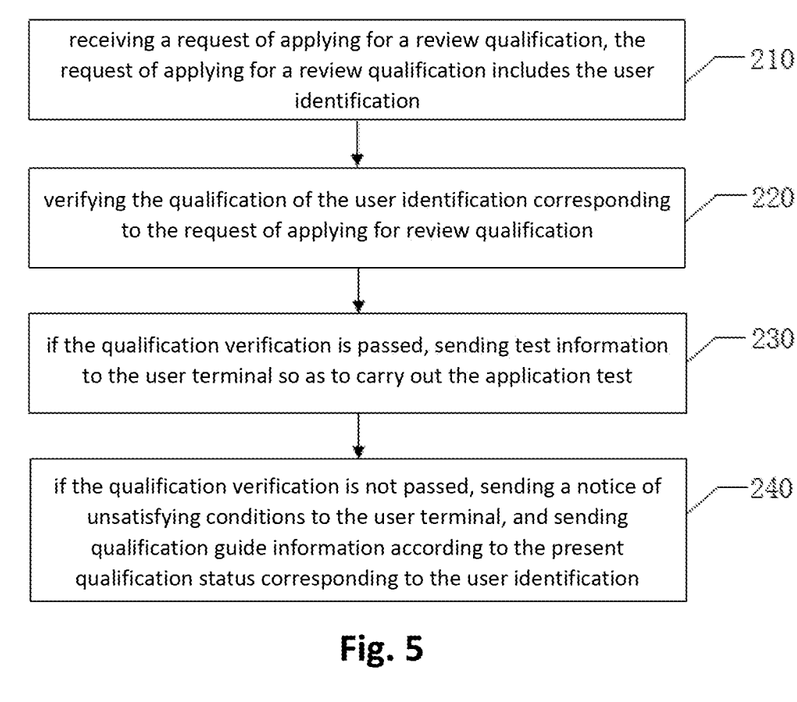
FIG. 5 is a flowchart illustrating an example process of the second embodiment of the present disclosure.

FIG. 5 is a flow chart of the second embodiment of the performance evaluating method of the present invention. As shown in FIG. 5, the performance evaluating method of the present embodiment is implemented by a server. The different between the present embodiment and the first embodiment is that, before the step 110, the performance evaluating method of the present embodiment further comprises:

Step 210, receiving a request of applying for a review qualification, the request of applying for a review qualification includes the user identification.

Any community user can apply for the review qualification. When the user carries out the application operation at the user terminal, the user sends the corresponding request of applying for review qualification to the server according to the user identification.

Step 220, verifying the qualification of the user identification corresponding to the request of applying for review qualification.

After the user carrying out the applying for review qualification, the server receives the information corresponding to the user identification, and determines whether the preset qualification is met. The preset qualification includes, but not limited, full member with level above the designated level, no illegal record within the recently set days, real name authenticated, the account is not prohibited, the account credit score is greater than the set value.

Step 230, if the qualification verification is passed, sending test information to the user terminal so as to carry out the application test.

In one embodiment, the step 230 comprises: sending test questions to the user terminal and receiving answer information; judging whether a rate of correct answer reach a threshold or not; if the rate of correct answer reaches the threshold, giving the user identification a review qualification with a set duration, starting the performance evaluating corresponding to the user identification; if the rate of correct answer does not reach the threshold, sending a test failure information to the user terminal. Wherein, if the qualification verification of the user identification corresponding to the request of applying for review qualification is passed, then the questions are randomly selected from the test database and sent to users for answering. The questions are the reporting cases had decision result. If the correct rate of the user's answer reaches the preset threshold, it can be, but is not limited, 80%, passed the test, giving the user identification a review qualification with set duration, starting the performance evaluating corresponding to the user identification; if the rate of correct answer does not reach the threshold, sending a test failure information to the user terminal. A single user can have up to five test chances each day.

In one embodiment, after the step of giving the user identification a review qualification with a set duration, starting the performance evaluating corresponding to the user identification, further comprises: judging whether the user identification is first time be given the review qualification; if the user identification is first time be given the review qualification, sending a teaching exhibition information to the user terminal corresponding to the user identification. Wherein, for those user identifications got the review qualification first time, the correspondingly users probably don't know how to review and the specific rules and regulations of the review mechanism. Therefore, if the user identification is the first time with review qualification, sending a teaching exhibition information to the user terminal corresponding to the user identification. The teaching exhibition information includes, but not limited, review functional animation demo, the code of the community, community rules system, review mechanism rules system and typical review case presentation.

Step 240, if the qualification verification is not passed, sending a notice of unsatisfying conditions to the user terminal, and sending qualification complete guide information according to the present qualification status corresponding to the user identification.

If the user identification corresponding to the request of applying for review qualification does not meet the preset qualification, then the qualification verification is not passed, meanwhile, sending qualification complete guide information according to the present qualification status corresponding to the user identification, so as to guide the user to complete the qualification information to reach the status of preset qualification to the greatest extent possible.

Embodiment 3

Figure 6:
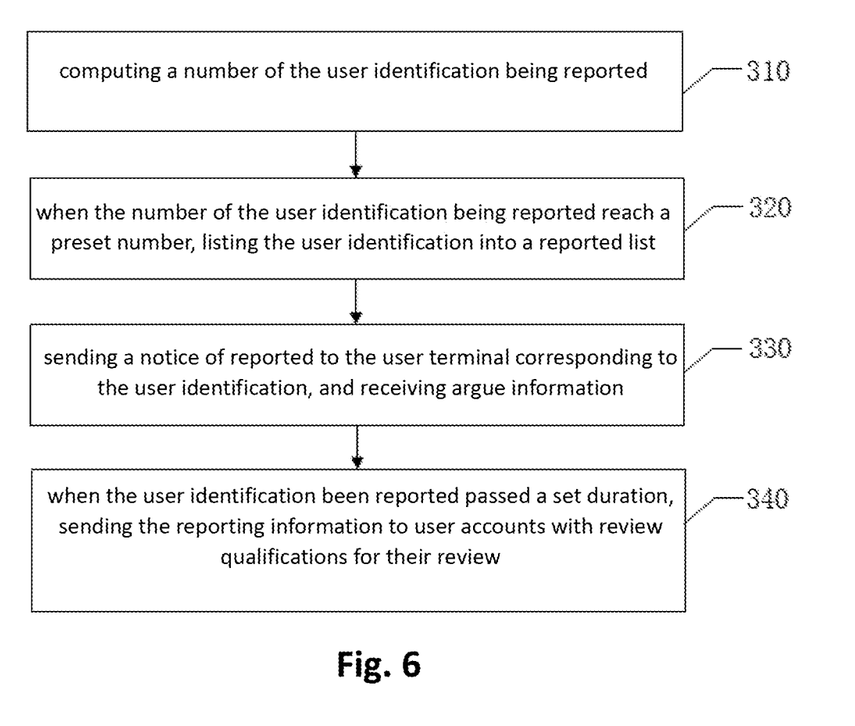
FIG. 6 is a flowchart illustrating an example process of the third embodiment of the present disclosure.

FIG. 6 is a flow chart of the third embodiment of the performance evaluating method of the present invention. As shown in FIG. 6, the performance evaluating method of the present embodiment is implemented by a server. The different between the present embodiment and the first embodiment is that, when the information related to a review behavior includes reporting information against a review behavior by the user identification with the review qualification, the performance evaluating method of the present embodiment further comprises:

Step 310, computing a reporting times of the user identification.

Users can comment on the voting cases and release their viewpoints when they vote on the voting cases. When other users find out the comments and viewpoints are illegal, they can report the comments and viewpoints. When the server receives the corresponding reporting information, it accumulates the reporting times of the corresponding user identification. The reporting information includes the reporting reason, reporting content, the reported user identification and the user identification of the report. The accumulation of the reporting times can base on the same reporting content or the different reporting content.

Step 320, when the reporting times of the user identification reach a set times, listing the user identification into a reported list.

The set times can be, but is not limited to, 3. That means, when the user identification be reported 3 times, the user identification will be listed into a reported list, and enter a status of public preparation.

Step 330, sending a notice of reported to the user terminal corresponding to the user identification, and receiving argue information.

After the user identification is listed into the reported list, the corresponding user terminal receives the notice of reported, at this time, the user can release defense opinions within a set time, for example, 24 hours.

Step 340, when the user identification been reported passed a set duration, sending a publicity information of the reporting information which against a review behavior to the user terminal corresponding to the user identification with the review qualification.

At the end of the set duration, the report information of the review behavior corresponding to the user identification will be published anonymously. Multiple contents of the report will be combined display, and the user identification of the report will be displayed with the real name and the report reason.

In one embodiment, after the step 340, the method further comprises: receiving a review aim to the reporting information against the review behavior; when amount of the reviews reaches a preset value, computing review result; if the review result is illegal ratio greater than a preset ratio, changing the publicity into a recheck status; if the review result is legal ratio greater than a preset ratio, repealing the publicity; if the review result is neither illegal ratio nor legal ratio greater than a preset ratio, return to the step of receiving a review aim to the reporting information against the review behavior.

After the reporting information published, the report information of the review behavior shall be determined after receiving every 100 votes by the user identifications with review qualification. The preset ratio can be, but not limited to, 70%. Therefore, when legal ratio greater than 70%, the publicity will be automatic repealed; when illegal ratio is greater than 70%, the publicity will be changed into a "recheck" status; the administrator will decide whether to revoke the review qualification after the recheck. If the above conditions are not met, another 100 voting places will be open. When the number of votes reaches the limit the system, the publicity will be automatic repealed. Users can browse the publicity and decision results made in 3 days.

Embodiment 4

Figure 7:
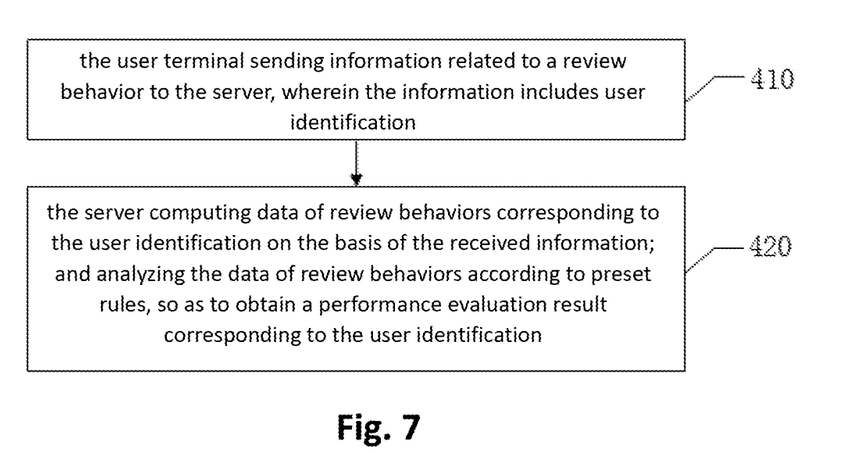
FIG. 7 is a flowchart illustrating an example process of the fourth embodiment of the present disclosure.

FIG. 7 is a flow chart of the fourth embodiment of the performance evaluating method of the present invention. As shown in FIG. 7, the performance evaluating method of the present embodiment is applied between a server and a user terminal, the method may comprise following steps:

Step 410, the user terminal sending an information related to a review behavior to the server, wherein the information includes user identification.

Wherein, the information related to a review behavior refers to the information collected can reflect the review behavior of the user during the valid period of the review qualification corresponding to the user identification, such as voting information, viewpoint information, viewpoint being licked and disliked information, validation question answer information, anti-cheating warning information, illegal information, being reported information, etc. When the user doing operation related to review behavior on the user terminal, the user terminal obtains the corresponding information and sends it to the server, in order to correlate the information sent by the user terminal with the user identification, the information sent by the user terminal related to the review behavior includes the user identification, which can be, but is not limited to, the user account.

Step 420, the server computing data of review behaviors corresponding to the user identification on the basis of the received information; and analyzing the data of review behaviors according to preset rules, so as to obtain a performance evaluating result corresponding to the user identification.

After receiving the information related to the review behavior, through statistical analysis of the information, the server can obtain the data of review behavior corresponding to the user identification. Since the data of review behavior is obtained from the original data analysis with the information related to the review behavior, it can objectively reflect the review behavior process of a user in a certain period.

In one embodiment, the data of review behavior include number of voting cases, voting accurate number, voting accurate rate, number of viewpoints, number of viewpoints liked and disliked, active days, illegal times, number of incorrect validation questions, level of anti-cheating alarm as well as their combinations. In other words, the data of review behavior can include one or more of the number of voting cases, voting accurate number, voting accurate rate, number of viewpoints, number of viewpoints liked and disliked, active days, illegal times, number of incorrect validation questions and level of anti-cheating alarm.

In one embodiment, the step of analyzing the data of review behaviors according to preset rules, so as to obtain a performance evaluating result corresponding to the user identification includes: obtaining the data of review behaviors corresponding to each evaluation coefficient; determining the value of each evaluation coefficient according to the preset rules and the corresponding data of review behaviors, wherein, said preset rules include the corresponding relationship between the ranges of the values of the data of review behaviors and the values of evaluation coefficients; calculating a performance evaluating score corresponding to the user identification according to each evaluation coefficient and certain data of review behaviors.

In one embodiment, the evaluation coefficients include voting accurate coefficient, active coefficient, illegal coefficient, viewpoint coefficient, incorrect validation coefficient, anti-cheating coefficient as well as their combinations, the certain data of review behaviors include number of voting cases, voting accurate rate, number of viewpoints, number of viewpoints liked and disliked as well as their combinations.

In one embodiment, after the step 420, the method further comprises: the user terminal further used to send a review interface access information to the server, wherein the review interface access information includes user identification; after analyzing the data of review behaviors according to preset rules, so as to obtain a performance evaluating result corresponding to the user identification, the server monitoring review interface access information sent by the user terminal, if the present received review interface access information is the first received review interface access information after the valid period of the review qualification corresponding to the user identification, sending the performance evaluating result to the user terminal corresponding to the user identification to display. When sending the performance evaluating result to the user terminal corresponding to the user identification to display, other related information may be displayed at same time, such as user profile picture, nickname, number, starting and ending time of the valid period of review qualification, number of votes within the valid period of review qualification, active days, rank of performance evaluating score, performance level, bonus detail, etc. After closing the above display, users can also review it through the entrance on the home page of the review interface.

The other steps not be described of the present embodiment of the performance evaluating method may refer to the specific content described in the embodiment 1 to the embodiment 3, and it will not be repeated here.

Embodiment 5

Figure 8:
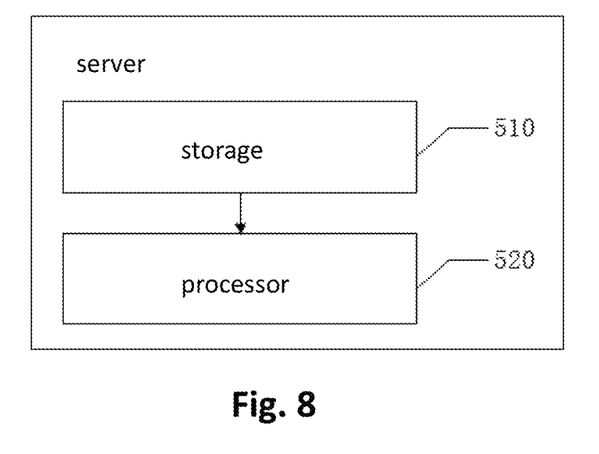
FIG. 8 is a structure block diagram of an example server of the fifth embodiment of the present disclosure.

FIG. 8 is a structure block diagram of the fifth embodiment of the server of the present invention. As shown in FIG. 8, the server of the present embodiment comprises a storage 510 and a processor 520. The storage 510 is used to store executable program codes; and the processor 520 is used to invoke the executable program codes in the storage, so as to implement the performance evaluating method according to the embodiment 1 to the embodiment 3.

Embodiment 6

Figure 9:
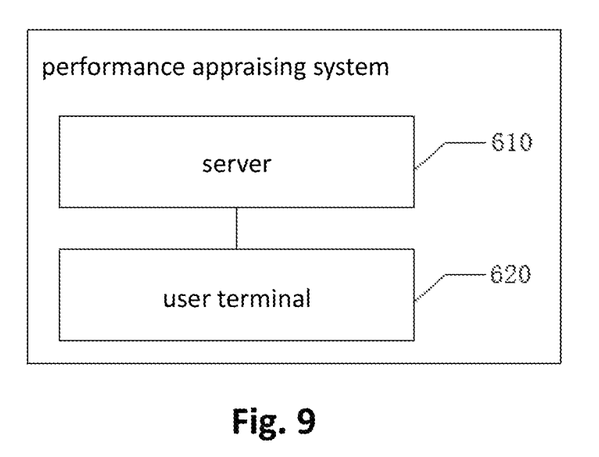
FIG. 9 is a structure block diagram of an example system of the sixth embodiment of the present disclosure.

FIG. 9 is a structure block diagram of the sixth embodiment of the performance evaluating system of the present invention. As shown in FIG. 9, the performance evaluating system of the present embodiment comprises a server 610 and a user terminal 620.

The user terminal 620 is used to send an information related to a review behavior to the server, wherein the information includes user identification;

The server 610 is used to compute data of review behaviors corresponding to the user identification on the basis of the received information; and to analyze the data of review behaviors according to preset rules, so as to obtain a performance evaluating result corresponding to the user identification.

In one embodiment, the server 610 is used to obtain the data of review behaviors corresponding to each evaluation coefficient; determine the value of each evaluation coefficient according to the preset rules and the corresponding data of review behaviors, wherein, the preset rules include the corresponding relationship between the ranges of the values of the data of review behaviors and the values of evaluation coefficients; and calculate a performance evaluating score corresponding to the user identification according to each evaluation coefficient and certain data of review behaviors.

In one embodiment, the user terminal 620 is further used to send a review interface access information to the server, wherein the review interface access information includes user identification;

the server 610 is further used to analyze the data of review behaviors according to preset rules, so as to obtain a performance evaluating result corresponding to the user identification, then the server 620 is further used to monitor review interface access information sent by the user terminal, if the present received review interface access information is the first received review interface access information after the valid period of the review qualification corresponding to the user identification, send the performance evaluating result to the user terminal 620 corresponding to the user identification to display.

The other working process of the present embodiment of the performance evaluating system may refer to the specific content described in the embodiment 1 to the embodiment 3, and it will not be repeated here.

The performance evaluating method, the server and the performance evaluating system provided by the present invention can evaluate the performance of users' review behaviors according to the data of review behaviors corresponding to the user identification, so as to improve the management efficiency of users' review behaviors, and which is conducive to form a virtuous community ecology of self-purification, autonomy and self-kindness.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computer-implemented method for improving a computer network community, comprising:
    authorizing, by a server, a first user account a review qualification of reviewing events in a network community for a first valid period, wherein a first user account is among a plurality of user accounts in the network community;
    automatically initiating, by the server, a performance evaluation for the first user account in response to authorizing the first user account the review qualification;
    monitoring, by the server, information associated with the first user account reviewing the events in the network community;
    generating, by the server, data indicative of review behaviors associated with the first user account during at least a part of the first valid period based at least in part on the information and predetermined parameters of evaluating performance of reviewing events in the network community;
    determining, by the server, values of a plurality of evaluation coefficients based on the generated data and predetermined rules, wherein the plurality of evaluation coefficients comprise voting accuracy coefficient, active coefficient, violation coefficient, comment coefficient, incorrect answer coefficient, and anti-cheating coefficient, and wherein the predetermined rules comprise corresponding relationships between the generated data and the plurality of evaluation coefficients;
    determining, by the server, a result of the performance evaluation for the first user account based on the generated data and the values of the plurality of evaluation coefficients;
    determining, by the server, whether to revoke or maintain the review qualification of the first user account based on the result of the performance evaluation;
    sending, by the server, a post relating to a report against a review behavior of the first user account to a second plurality of user accounts for review, wherein the second plurality of user accounts are authorized to review the events in the network community;
    receiving, by the server, reviews from the second plurality user accounts;
    in response to a determination that a number of the received reviews reaches a predetermined threshold, analyzing the received reviews by the server;
    in response to a determination that a number of reviews indicative of the first user account involving a violation relative to a total number of the received reviews is greater than a first predetermined ratio, modifying, by the server, a status of the post as a recheck status;
    in response to a determination that a number of reviews indicative of the first user account not involving a violation relative to a total number of the received reviews is greater than a second predetermined ratio, modifying, by the server, the status of the post as a withdrawal status; and
    otherwise, determining, by the server, to return to a status of receiving reviews from the second plurality user accounts.

2. The computer-implemented method of claim 1, further comprising:
    determining, by the server, whether to assign a new event in the network community to the first user account for review based on the performance evaluation result of the first user account.

3. The computer-implemented method of claim 1, wherein the determining values of a plurality of evaluation coefficients further comprises:
    determining an adjusting coefficient, wherein the adjusting coefficient is a ratio of a lapse of time of the first valid period relative to a total time of the first valid period; and
    adjusting the corresponding relationships between the generated data and the plurality of evaluation coefficients based on the adjusting coefficient.

4. The computer-implemented method of claim 1, wherein the generated data comprise a number of events the first user account voted for or against, a voting accuracy number, a voting accuracy rate, a number of comments given by the first user account, a number of comments being liked and disliked, active days of the first user account in the network community, a number of violations, a number of incorrect answers for validation questions, and a level of anti-cheating alarm.

5. The computer-implemented method of claim 1, further comprising:
    determining, by the server, whether the first valid period has expired;
    determining, by the server, a rank of the first user account among a second plurality of user accounts based on the performance evaluation result of the first user account in response to a determination that the first valid period has expired, wherein the second plurality of user accounts are authorized to review events in the network community; and
    determining, by the server, a performance level and a bonus for the first user account based on the rank.

6. The computer-implemented method of claim 1, further comprising:
    receiving, by the server, information indicative of the first user account accessing a review interface via a client computing device for a first time since the first valid period expired; and sending, by the server, the performance evaluation result of the first user account to the client computing device for display.

7. The computer-implemented method of claim 1, further comprising:
receiving, by the server, a request for applying for a review qualification from a second user account;
verifying, by the server, the second user account based on predetermined rules;
in response to a determination that the second user account passes a verification, sending, by the server, test questions to the second user account; and
in response to a determination that the second user account does not pass the verification, sending, by the server, the second user account a notification of failure to satisfy the predetermined rules and information indicative of a guidance that the second user account uses to improve an application for the review qualification.

8. The computer-implemented method of claim 7, further comprising:
receiving, by the server, answers to the test questions from the second user account;
in response to a determination that an accurate rate of the answers reaches a predetermined threshold, authorizing, by the server, the second user account the review qualification for a predetermined valid period and initiating, by the server, a performance evaluation for the second user account; and
in response to a determination that the accurate rate of the answers does not reach the predetermined threshold, sending, by the server, the second user account a notification of failure to pass a test.

9. The computer-implemented method of claim 8, further comprising:
determining, by the server, whether the second user account is authorized the review qualification for a first time; and
in response to a determination that the second user account is authorized for the first time, sending, by the server, teaching information to the second user account.

10. The computer-implemented method of claim 1, wherein the generated data further comprises data relating to one or more reports against one or more review behaviors associated with the first user account.

11. The computer-implemented method of claim 10, further comprising:
determining, by the server, a number of the one or more reports; and
in response to a determination that the number of the one or more reports reaches a predetermined threshold, adding, by the server, the first user account into a list of user accounts being reported.

12. The computer-implemented method of claim 10, further comprising:
sending, by the server, the first user account a notification of being reported upon receiving the report against the review behavior of the first user account;
receiving, by the server, information indicative of arguments against the report from the first user account within a predetermined period; and
in response to a determination that the predetermined period has expired, sending, by the server, the post relating to the report to the second plurality of user accounts for review.

13. The computer-implemented method of claim 1, further comprising:

determining, by the server, whether to automatically revoke a review qualification of the first user account based on the generated data and at least one predetermined rule, wherein the at least one predetermined rule comprises whether the number of violations associated with the first user account has reached a predetermined threshold; and
automatically revoking, by the server, the review qualification of the first user account and ending, by the server, a performance evaluation for the first user account in response to a determination that the at least one predetermined rule has been satisfied.

14. A computing system of improving a computer network community, comprising:
a processor; and
a memory communicatively coupled to the processor to configure the processor at least to:
authorize a first user account a review qualification of reviewing events in a network community for a first valid period, wherein a first user account is among a plurality of user accounts in the network community;
automatically initiate, by the server, a performance evaluation for the first user account in response to authorizing the first user account the review qualification;
monitor information associated with the first user account reviewing the events in the network community;
generate data indicative of review behaviors associated with the first user account during at least a part of the first valid period based at least in part on the information and predetermined parameters of evaluating performance of reviewing events in the network community;
determine values of a plurality of evaluation coefficients based on the generated data and predetermined rules, wherein the plurality of evaluation coefficients comprise voting accuracy coefficient, active coefficient, violation coefficient, comment coefficient, incorrect answer coefficient, and anti-cheating coefficient, and wherein the predetermined rules comprise corresponding relationships between the generated data and the plurality of evaluation coefficients;
determine a result of the performance evaluation for the first user account based on the generated data and the values of the plurality of evaluation coefficients;
determine, by the server, whether to revoke or maintain the review qualification of the first user account based on the result of the performance evaluation;
send, by the server, a post relating to a report against a review behavior of the first user account to a second plurality of user accounts for review, wherein the second plurality of user accounts are authorized to review the events in the network community;
receive, by the server, reviews from the second plurality user accounts;
in response to a determination that a number of the received reviews reaches a predetermined threshold, analyze the received reviews by the server;
in response to a determination that a number of reviews indicative of the first user account involving a violation relative to a total number of the received reviews is greater than a first predetermined ratio, modify, by the server, a status of the post as a recheck status;

in response to a determination that a number of reviews indicative of the first user account not involving a violation relative to a total number of the received reviews is greater than a second predetermined ratio, modify, by the server, the status of the post as a withdrawal status; and otherwise, determine, by the server, to return to a status of receiving reviews from the second plurality user accounts.

15. The computing system of claim 14, the memory further configuring the processor at least to:

determine whether to assign a new event in the network community to the first user account for review based on the performance evaluation result of the first user account.

16. The computing system of claim 14, the memory further configuring the processor at least to:

determine an adjusting coefficient, wherein the adjusting coefficient is a ratio of a lapse of time of the first valid period relative to a total time of the first valid period; and adjust the corresponding relationships between the generated data and the plurality of evaluation coefficients based on the adjusting coefficient.

17. The computing system of claim 14, wherein the generated data comprise a number of events the first user account voted for or against, a voting accuracy number, a voting accuracy rate, a number of comments given by the first user account, a number of comments being liked and disliked, active days of the first user account in the network community, a number of violations, a number of incorrect answers for validation questions, and a level of anti-cheating alarm.

18. A non-transitory computer-readable storage medium bearing computer-readable instructions that upon execution on a computing device cause the computing device at least to:

authorize a first user account a review qualification of reviewing events in a network community for a first valid period, wherein a first user account is among a plurality of user accounts in the network community;

automatically initiate, by the server, a performance evaluation for the first user account in response to authorizing the first user account the review qualification;

monitor information associated with the first user account reviewing the events in the network community;

generate data indicative of review behaviors associated with the first user account during at least a part of the first valid period based at least in part on the information and predetermined parameters of evaluating performance of reviewing events in the network community;

determine values of a plurality of evaluation coefficients based on the generated data and predetermined rules, wherein the plurality of evaluation coefficients comprise voting accuracy coefficient, active coefficient, violation coefficient, comment coefficient, incorrect answer coefficient, and anti-cheating coefficient, and wherein the predetermined rules comprise corresponding relationships between the generated data and the plurality of evaluation coefficients;

determine a result of the performance evaluation for the first user account based on the generated data and the values of the plurality of evaluation coefficients; and determine, by the server, whether to revoke or maintain the review qualification of the first user account based on the result of the performance evaluation send, by the server, a post relating to a report against a review behavior of the first user account to a second plurality of user accounts for review, wherein the second plurality of user accounts are authorized to review the events in the network community;

receive, by the server, reviews from the second plurality user accounts;

in response to a determination that a number of the received reviews reaches a predetermined threshold, analyze the received reviews by the server;

in response to a determination that a number of reviews indicative of the first user account involving a violation relative to a total number of the received reviews is greater than a first predetermined ratio, modify, by the server, a status of the post as a recheck status;

in response to a determination that a number of reviews indicative of the first user account not involving a violation relative to a total number of the received reviews is greater than a second predetermined ratio, modify, by the server, the status of the post as a withdrawal status; and otherwise, determine, by the server, to return to a status of receiving reviews from the second plurality user accounts.

* * * * *